United States Patent
Aguera y Arcas et al.

(10) Patent No.: US 9,600,353 B2
(45) Date of Patent: Mar. 21, 2017

(54) PERSISTENT AND RESILIENT WORKER PROCESSES

(71) Applicant: Microsoft Technology Licensing, LLC, Redmond, WA (US)

(72) Inventors: Blaise Aguera y Arcas, Seattle, WA (US); Hen Fitoussi, Tel-Aviv (IL); John Daniell Hebert, San Francisco, CA (US); Benny Schlesinger, Ramat Hasharon (IL); Eran Yariv, Zichron Yaakov (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/811,761

(22) Filed: Jul. 28, 2015

(65) Prior Publication Data
US 2015/0331726 A1 Nov. 19, 2015

Related U.S. Application Data

(63) Continuation of application No. 13/713,536, filed on Dec. 13, 2012, now Pat. No. 9,092,247.
(Continued)

(51) Int. Cl.
*G06F 13/00* (2006.01)
*G06F 9/54* (2006.01)
(Continued)

(52) U.S. Cl.
CPC .............. *G06F 9/542* (2013.01); *G06F 9/455* (2013.01); *G06F 9/45533* (2013.01);
(Continued)

(58) Field of Classification Search
CPC ....... G06F 9/45533; G06F 9/542; G06F 9/546
(Continued)

(56) References Cited

U.S. PATENT DOCUMENTS 6,463,446 B1 10/2002 Wollrath et al.
7,559,065 B1 7/2009 Sosnovsky et al.
(Continued)

FOREIGN PATENT DOCUMENTS

KR 10-3009-0092570 A 9/2009

OTHER PUBLICATIONS

Notice of Allowance cited in U.S. Appl. No. 13/713,536 dated Mar. 18, 2015, 18 pgs.
Int. Search Report cited in PCT Application No. PCT/US2013/031115 dated Jun. 20, 2013, 8 pgs.
Int. Preliminary Report cited in PCT Application No. PCT/US2013/031115 dated Oct. 1, 2014, 5 pgs.
EP Search Report cited in EP Application No. 13767775.3 dated Dec. 16, 2015, 8 pgs.
(Continued)

*Primary Examiner* — Andy Ho
(74) *Attorney, Agent, or Firm* — Steven Spellman; Tom Wong; Micky Minhas (57) ABSTRACT

In the field of computing, many scenarios involve the execution of an application within a virtual environment (e.g., web applications executing within a web browser). In order to perform background processing, such applications may invoke worker processes within the virtual environment; however, this configuration couples the life cycle of worker processes to the life cycle of the application and/or virtual environment. Presented herein are techniques for executing worker processes outside of the virtual environment and independently of the life cycle of the application, such that background computation may persist after the application and/or virtual environment are terminated and even after a computing environment restart, and for notifying the application upon the worker process achieving an execution event (e.g., detecting device events even while the application is not executing). Such techniques may heighten the resiliency and persistence of worker processes and expand the capabilities of applications executing within virtual environments.

20 Claims, 8 Drawing Sheets

Related U.S. Application Data (60) Provisional application No. 61/617,474, filed on Mar. 29, 2012.

(51) Int. Cl.
*G06F 9/455* (2006.01)
*G06F 9/48* (2006.01)

(52) U.S. Cl.
CPC .......... *G06F 9/547* (2013.01); *G06F 9/45504* (2013.01); *G06F 9/485* (2013.01)

(58) Field of Classification Search
USPC ...................................... 718/1; 719/313, 318
See application file for complete search history.

(56) References Cited

U.S. PATENT DOCUMENTS

| | | |
|---|---|---|
| 8,065,659 B1 | 11/2011 | Prince et al. |
| 8,621,628 B2 | 12/2013 | Zeitlin et al. |
| 8,682,351 B1 | 3/2014 | Chhabra |
| 9,075,672 B2 | 7/2015 | Beckman et al. |
| 2007/0240157 A1 | 10/2007 | Herenyi et al. |
| 2009/0282474 A1 | 11/2009 | Chen et al. |
| 2010/0115332 A1 | 5/2010 | Zheng et al. |
| 2010/0325414 A1 | 12/2010 | Fries et al. |
| 2011/0154441 A1 | 6/2011 | Oh et al. |
| 2011/0219385 A1 | 9/2011 | Jacobson et al. |
| 2012/0042365 A1 | 2/2012 | Shoval et al. |
| 2013/0091197 A1 | 4/2013 | Bar-Zeev et al. |
| 2013/0097440 A1 | 4/2013 | Bar-Zeev et al. |
| 2013/0103715 A1 | 4/2013 | Beckman et al. |

OTHER PUBLICATIONS

"Developing HTML5 Applications for Intel AppUp(SM)—Part 2: Web Workers Application", Jeff Tranter, Jan. 12, 2012, reprinted from the Internet at: http://www.codeproject.com/Articles/313704/Developing-HTML-Applications-for-Intel-AppUp-SM-c, 5 pgs.

"The Year in Review: W3C Web Performance Working Group", Jatinder Mann, Aug. 17, 2011, reprinted from the Internet at: https://blogs.msdn.microsoft.com/ie/2011/08/17/the-year-in-review-w3c-web-performance-working-group/, 10 pgs.

"Patterns for High Availability, Scalability, and Computing Power with Windows Azure", Joseph Joshy, Apr. 24, 2009, reprinted from the Internet at: https://msdn.microsoft.com/en-us/magazine/dd727504.aspx, 10 pgs.

"Effects and Opportunities of Native Code Extensions for Computationally Demanding Web Applications", Dennis Jarosch, Feb. 23, 2012, reprinted from the Internet at: http://edoc.hu-berlin.de/dissertationen/jarosch-dennis-2011-12-16/PDF/jarosch.pdf, 179 pgs.

"HTML5 fundamentals, Part 3: the power of HTML5 APIs", Grace Walker, Jun. 7, 2011, reprinted from the Internet at: http://www.ibm.com/developerworks/library/wa-html5fundamentals3/, 12 pgs.

"Native Client: A technology for Running Native Code on the Web", Brad Chen, Dec. 8, 2008, reprinted from the Internet at: http://googlecode.blogspot.com/2008/12/native-client-technology-for-running.html, 22 pgs.

"Office Action Issued in European Patent Application No. 13767775.3", Mailed Date: Nov. 29, 2016, 5 pages.

Schmidt C. Douglas, "Asynchronous Completion Token", Retrieved from: <<http://www.csmustledu/~schmidt/PDF/Act.pdf>>, Nov. 26, 1999, 16 pages.

PERSISTENT AND RESILIENT WORKER PROCESSES

CROSS-REFERENCE TO RELATED APPLICATIONS

This application is a continuation of U.S. Pat. No. 9,092, 247, also entitled "PERSISTENT AND RESILIENT WORKER PROCESSES," filed on Dec. 13, 2012, which in turn claims benefit under 35 U.S.C. §119(e) to U.S. Provisional Patent Application No. 61/617,474, filed on Mar. 29, 2012. The entirety of both U.S. patent application Ser. No. 13/713,536 and 61/617,474 are hereby incorporated by reference in their entirety as if fully rewritten herein.

BACKGROUND

Within the field of computing, many scenarios involve an execution of applications within virtual environments of a device, such as web applications executing within a web browser; code that is developed for a computational environment other than that provided by the device (e.g., Java code designed for a Java virtual machine); and untrusted code executing within an isolated virtual machine. The execution of the application within the virtual machine, rather than as a native process of the device, may facilitate the compatibility and security of the application during execution.

Such applications often involve background processing, such as long-running, computationally intensive processes. For example, an application may seek to monitor hardware components of the device for a particular type of event, such as an incoming call on a mobile phone. However, if such processing is performed by the application, other responsibilities of the application may be undesirably delayed; e.g., computationally intensive processing may preempt the handling of graphical user interface (GUI) messages, and may cause the application to present reduced interactivity or performance. In order to achieve such background processing while reducing interruption of other processing responsibilities of the application, the application may invoke one or more worker processes within the virtual environment. For example, the "web workers" model provided in recent versions of the Hypertext Markup Language (HTML) enables applications to request the web browser to initiate separate worker processes within the web browser, thus achieving background processing on behalf of the application in a secured and performant manner.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the instantiation of worker processes on behalf of applications executing within a virtual environment presents some advantages, models that also execute those worker processes within the virtual environment may present significant disadvantages. As a first example, the "web workers" model typically couples the life cycle of the web worker to the life cycle of the web application; i.e., when the web application is suspended or terminated (such as by closing the page hosting the web application), the web worker is also terminated. The worker processes may also be terminated upon termination of the virtual environment hosting the worker process (e.g., closing the web browser), and/or upon restarting the computing environment of the device (e.g., suspending or rebooting the operating system of the device). In some scenarios, associating the life cycle of the worker process with the life cycle of the application and/or virtual environment may be desirable. However, in other scenarios, it may be desirable to enable the worker process to persist after such events, and/or to persist through device events such as a reboot of the operating system.

Presented herein are techniques for extending the resiliency of worker processes executing on behalf of an application within a virtual environment, such as a web browser or virtual machine. In accordance with such techniques, rather than executing the worker process within the virtual environment, the device may execute the worker process outside of the virtual environment. When the application and/or virtual environment is terminated, the device may refrain from terminating the worker process, thus separating the life cycle of the worker process from the life cycle of the application. Optionally, the worker process may also be configured to persist through potentially interrupting events arising outside of the virtual environment, such as a fault in the process hosting the worker process or an operating system reboot. When the worker process achieves an execution event (e.g., completing a complex computational process or detecting a particular type of device event), the application executing within the virtual environment may be notified (optionally re-initiating the application if it is not currently executing) in order to fulfill the handling of the execution event achieved by the worker process. By decoupling the execution of worker processes from the execution of the application within the virtual environment, the techniques presented herein may expand the resiliency and capabilities of background processing achievable by applications within the virtual environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the execution of applications on a device within a virtual environment, rather than within the native computing environment of the device. As a first example, a web browser may provide a standardized platform for executing device-independent code, such as JavaScript and Hypertext Markup Language (HTML) content. As a second example, a Java virtual machine (JVM) may provide a bridge between a generalized computing device and the native capabilities of the device on behalf of a Java application (e.g., translating generalized memory allocation requests to the memory model of the device). As a third example, code designed for the native environment of a first device may be executed on a second, completely device through an emulator that provides a simulation of the first device within the second device. As a fourth example, untrusted code may be executed within a "sandbox" or an artificial machine, such that malicious operations may be isolated to the artificial machine, and the effects of the untrusted code on the artificial device may be evaluated by the device without risk of damage to the device.

These and other scenarios present the execution of an application within a virtual environment. In many such scenarios, the application may involve some foreground responsibilities to be handled in a performant manner; e.g., applications presenting a graphical user interface (GUI) may be designed to fulfill interactions with visual controls with a high degree of responsiveness, as even small delays are noticeable to the user. Such applications may also involve extensive background processing that may be performed in a more relaxed manner, such as long-running computations, maintenance tasks to be performed during idle moments, and monitoring events of the device.

In order to balance the handling of both foreground processing and background processing, virtual environments and applications may provide techniques such as preemptive multitasking, wherein the application may designate priorities for respective tasks. However, such techniques may not be completely adequate for scheduling the variety of processing tasks involved in an application. As a first such example, it may not be possible or efficient to preempt some types of background processing (e.g., background processing involving an exclusive locking of a resource) in order to handle foreground processing. As a second such example, if background processing that involves the monitoring of device events, the interruption of such background processing may result in a failure to detect such device events.

In view of these difficulties, some virtual environments permit applications to initiate a separate worker process within the virtual environment. By separating the worker process from the execution thread of the application, the virtual environment may utilize the concurrent processing capabilities of the computing environment (e.g., a more sophisticated preemptive scheduler provided by the operating system) and/or the computational hardware of the device (e.g., concurrent execution of the worker process and application thread on different processors in a multiprocessor device, or on different cores of a multicore processor). Moreover, the execution of the worker process within the same virtual environment as the application may provide advantages in security (e.g., applying the same security policy to the worker process as to the application) and/or efficiency (e.g., enabling a tight coupling of the application and the worker process as peers within the virtual environment).

Figure 1:
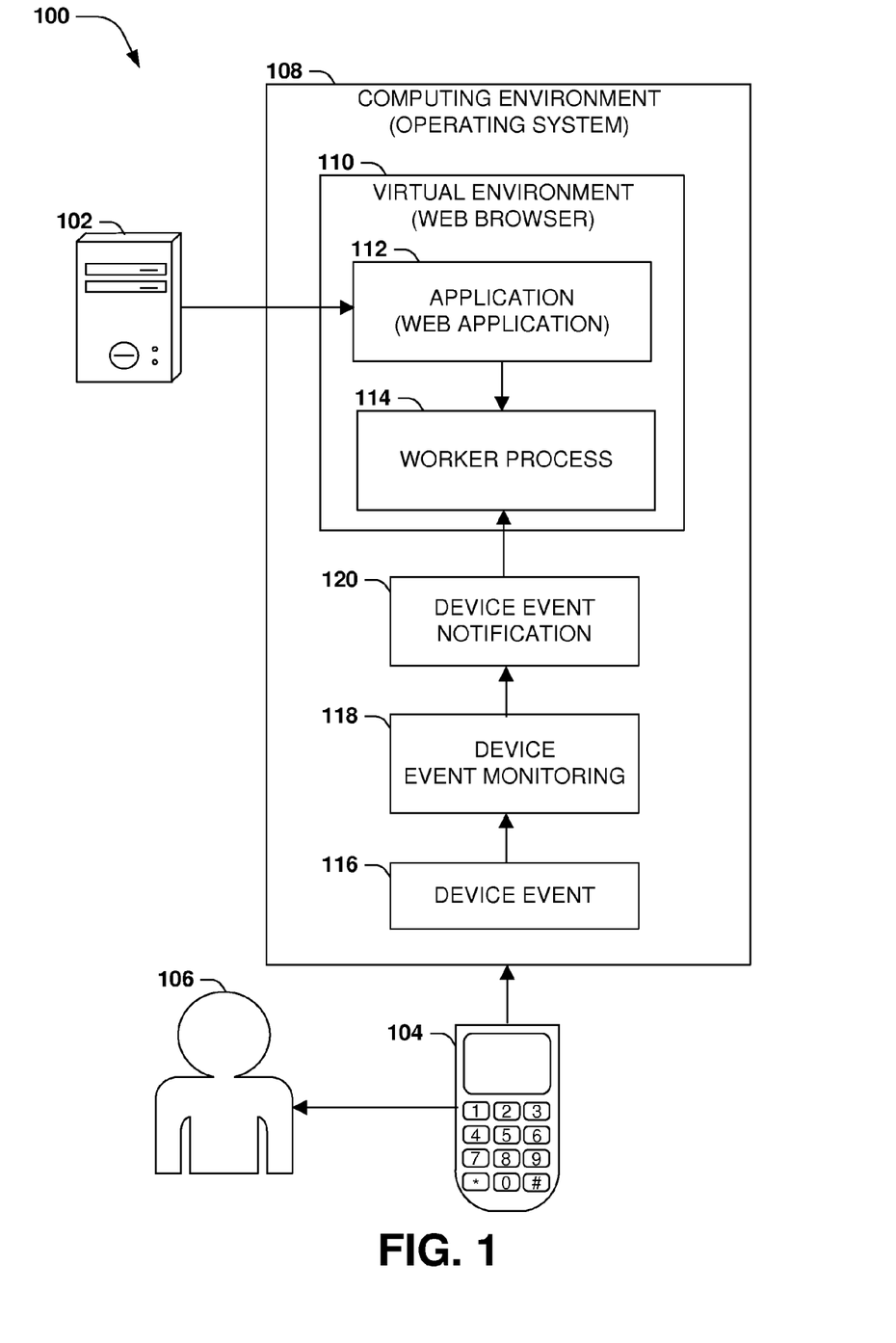
FIG. 1 is an illustration of an exemplary scenario featuring an execution of a worker process on behalf of a web application within a web browser.

FIG. 1 presents an illustration of an exemplary scenario 100 featuring a device 104 of a user 106 presenting a computing environment 108 (e.g., an operating system) comprising a virtual environment 110 (e.g., a web browser). The device 104 may communicate with one or more servers 102 (e.g., a webserver) and may retrieve one or more applications 112 to be executed on behalf of the user 106 (e.g., web applications embedded in web pages requested by the user 106). The device 104 may therefore initiate execution of the application 112 within the virtual environment 110. Moreover, the virtual environment 110 may be configured to enable the application 112 to request the execution of a worker process 114, such as a background maintenance task that is to be performed on behalf of the application 112 but without interrupting the execution of foreground processing by the application 112. The virtual environment 110 may therefore initiate execution of the worker process 114 within the virtual environment 110 alongside the application 112. For example, the worker process 114 may request to be notified of various device events 116, such as incoming calls or messages received through a mobile communication device such as a phone. The device 104 may apply some device event monitoring 118 within the computing environment 108, and upon detecting a device event 116, may deliver a device event notification 120 to the worker process 114 within the virtual environment 110. In this manner, the device 104 may enable the application 112 to invoke worker processes 114 within the virtual environment 110 to achieve various types of background processing without interrupting the foreground processing of the application 112. It may be appreciated that the model illustrated in the exemplary scenario 100 of FIG. 1 accurately describes the "web workers" model presented in recent versions of the Hypertext Markup Language (HTML), wherein JavaScript scripts may invoke background processing in a "web worker" process that is executed within the web browser alongside the script.

While the architecture presented in the exemplary scenario 100 of FIG. 1 may present some advantages, it may be appreciated that some disadvantages may also arise therein. In particular, the execution of the worker process 114 within the virtual environment 110 alongside the application 112 may be disadvantageous in certain respects. For example, in some scenarios, it may be desirable to couple the life cycle of the worker process 114 with the application 112, such that suspension or termination of the application 112 also results in suspension or termination of the worker process 114. However, in other scenarios, it may be desirable to decouple the application 112 and the worker process 114. For example, the worker process 114 may comprise a long-running process that the user 106 may wish to complete, but the user 106 may not wish to retain the application 112 within the virtual environment 110 (e.g., the user 106 may intentionally or inadvertently navigate away from a web page hosting a web application, thus causing the termination of web workers associated with the web application). As another example, the user 106 may wish the worker process 114 to persist indefinitely, such as a handler for particular types of device events 116 arising on the device 104 (e.g., a notification process to notify the user 106 upon receipt of a text message or incoming phone call). Moreover, in some scenarios, it may be desirable to enable the worker process 114 not only to persist after suspension or termination of the application 112, but also after suspension or termination of the virtual environment 110 (e.g., after the user 106 entirely terminates a web browser), and/or after interruption of the computing environment 108 (e.g., after rebooting or otherwise restarting the device 104). However, models that strictly involve the coupling of the life cycle of the worker process 114 with the life cycle of the application 112 may be incapable of providing such persistent and resilient worker processes 114.

B. Presented Techniques

Presented herein are techniques for improving the persistence and/or resilience of worker processes 114 executed on behalf of applications 112 executing within a virtual environment. In accordance with these techniques (and in contrast with other techniques such as those illustrated in the exemplary scenario 100 of FIG. 1), rather than executing the worker process 114 within the virtual environment 110, the device 104 may execute the worker process 114 on behalf of the application 112 but outside of the virtual environment 110. Moreover, when the device terminates the application 112 (e.g., temporarily or indefinitely suspending the application 112, or upon completing or aborting the execution of the application 112), the device 104 may refrain from terminating one or more worker processes 114 associated with the application 112. In this manner, the device 104 may enable the execution of persistent worker processes 114 that continue serving the computational processing of the application 112 even while the application 112 is not currently executing.

Figure 2:
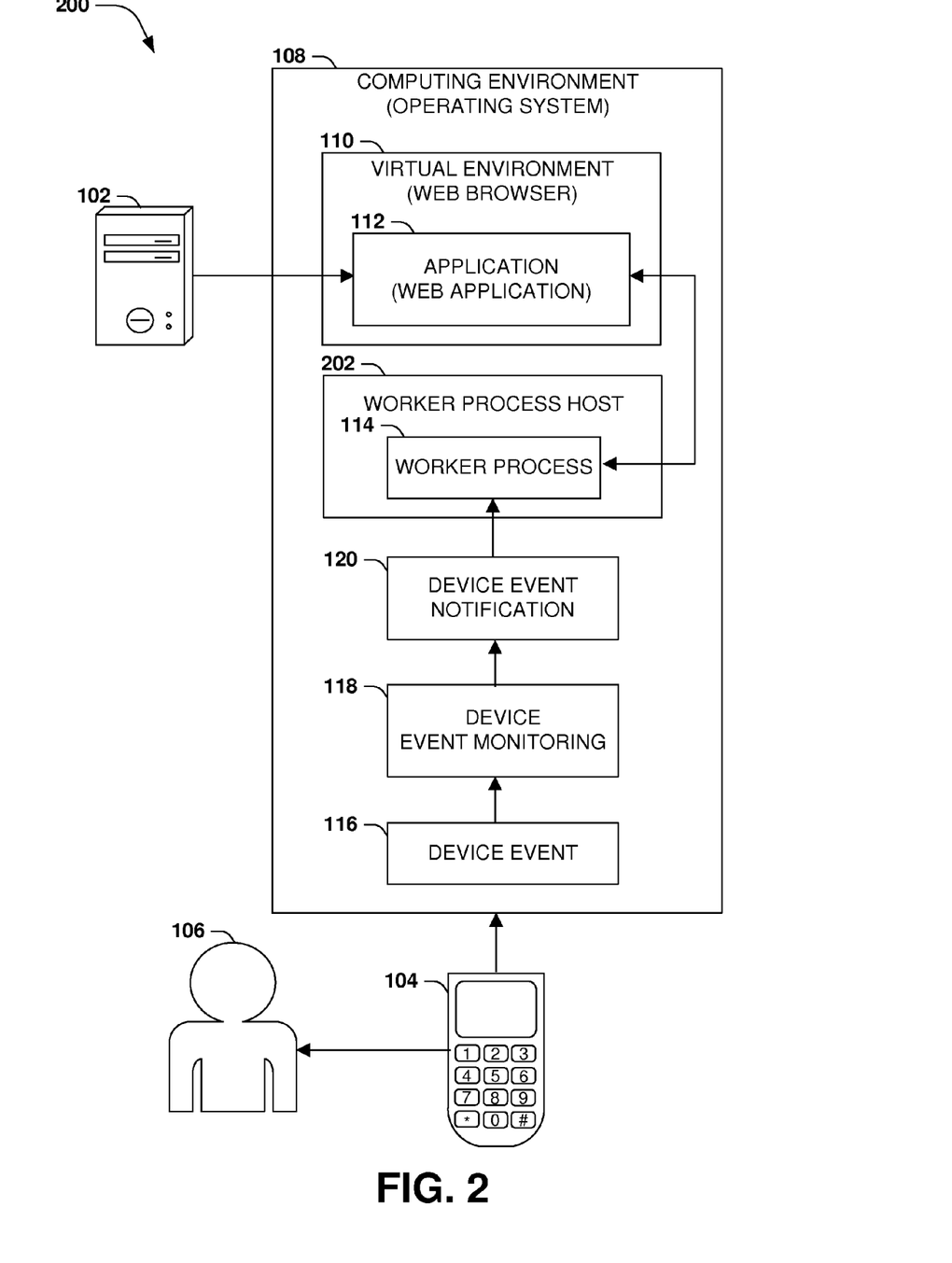
FIG. 2 is an illustration of an exemplary scenario featuring an execution of a worker process on behalf of an application in accordance with the techniques presented herein.

FIG. 2 presents an illustration of an exemplary scenario 200 featuring an exemplary application of the techniques presented herein. In this exemplary scenario 200, the device 104 again comprises a computing environment 108 including a virtual environment 110 wherein an application 112 received from a server 102 may be executed (e.g., a web application received from a webserver and executing within a web browser). The application 112 may request some background processing, and the virtual environment 110 may comply by initiating a worker process 114 on behalf of the application 112. However, in accordance with the techniques presented herein, the worker process 114 may be executed outside of the virtual environment 110 by a worker process host 202, which may manage the life cycle and resource requests of the worker process 114 independently of the management of the life cycle and resource requests of the application 112 by the virtual environment 110. In particular, upon detecting termination of the application 112, the device worker process host 202 may refrain from terminating the worker process 114; i.e., the life cycle of the worker process 114 may be separated from and managed independently of the life cycle of the application 112. The worker process host 202 may also enable the worker process 114 to notify the application 112 upon the worker process 114 achieving an execution event. For example, the background processing implemented by the worker process 114 may involve detecting a client device event 116, such as an incoming call from a mobile phone. The device may utilize some device event monitoring 118 to detect the device event 116 on behalf of the worker process 114, and may deliver a device event notification 120 to the worker process 114 upon detecting such a device event 116. Notably, this detection and delivery may be successfully completed while the worker process 114 is operating even if the application 112 is not currently executing (and, optionally, even if the virtual environment 110 is not executing on the device 104). Moreover, the worker process host 202 may facilitate the worker process 114 to notify the application 112 of the device event 116 (e.g., if the application 112 and/or virtual environment 110 are not currently executing, the device 104 may reinitiate the application 112 and/or virtual environment 110, or may simply enqueue the device event notification 120 until such processes are later reinitiated by the user 106). In this manner, the device 104 achieves the persistent execution of the worker process 114 independently of the execution of the application 112. These and other advantages may be achievable through the architecture illustrated in the exemplary scenario 200 of FIG. 2 and techniques presented herein.

C. Exemplary Embodiments

Figure 3:
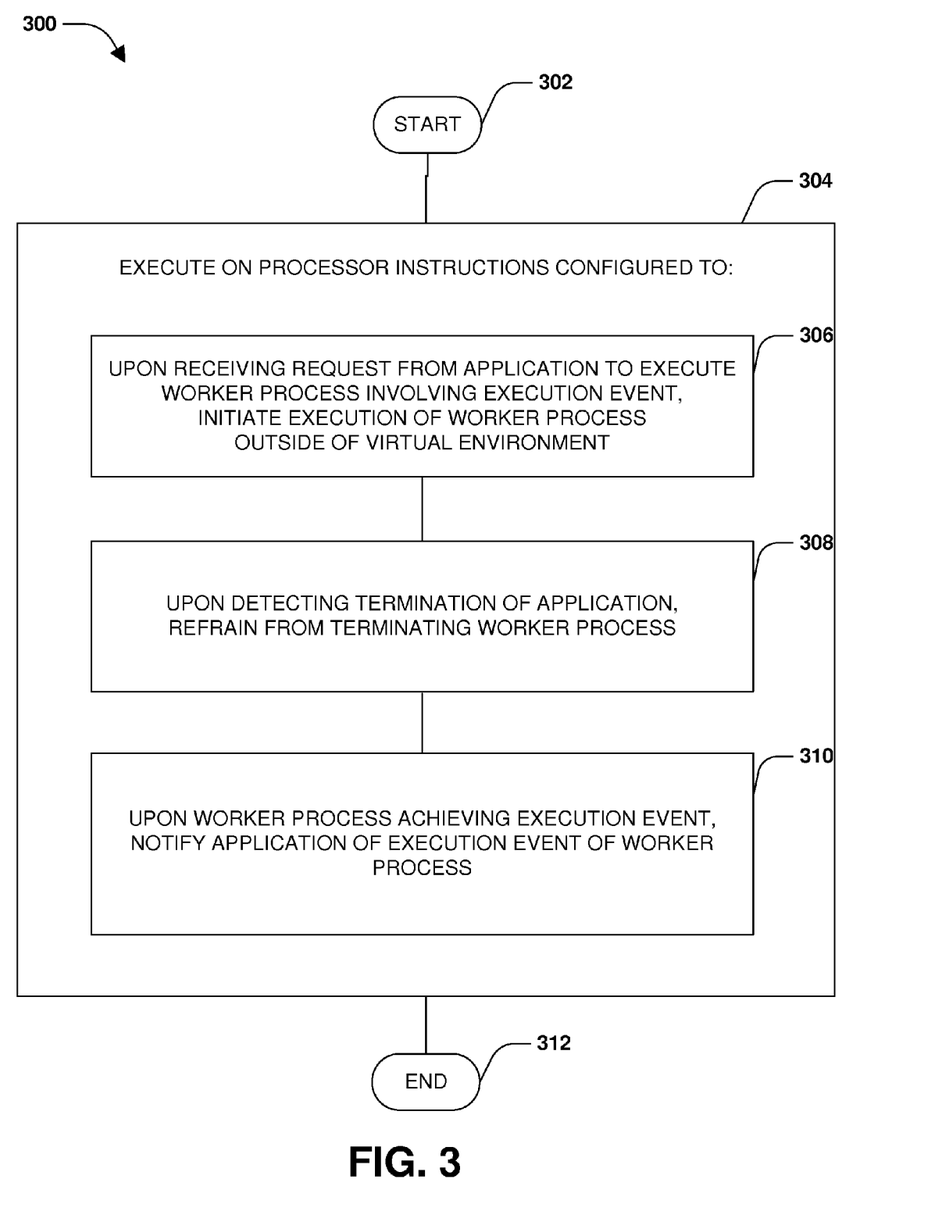
FIG. 3 is an illustration of an exemplary method of configuring a device to fulfilling requests of client applications related to local events in accordance with the techniques presented herein.

FIG. 3 presents a first exemplary embodiment of the techniques presented herein, illustrated as an exemplary method 300 of performing processing on behalf of applications 112 executing within a virtual environment 110 of a device 104. The exemplary method 300 may be implemented, e.g., as a set of instructions stored in a memory component of the device, such as a memory circuit, a platter of a hard disk drive, a solid-state storage device, or a magnetic or optical disc, and organized such that, when executed on a processor of the device, cause the device to operate according to the techniques presented herein. The exemplary method 300 begins at 302 and involves executing 304 the instructions on a processor of the device. Specifically, these instructions may be configured to, upon receiving a request from an application 112 to execute a worker process 114 involving an execution event, initiate 306 execution of the worker process 114 outside of the virtual environment 110. The instructions are also configured to, upon detecting termination of the application 112, refrain 308 from terminating the worker process 114. The instructions are also configured to, upon the worker process 114 achieving the execution event, notify 310 the application 112 of the execution event of the worker process 114. Having completed the processing on behalf of the application 112, the exemplary method 300 presents the execution of the worker process 114 on behalf of the application 112 in accordance with the techniques presented herein, and so ends at 312.

Figure 4:
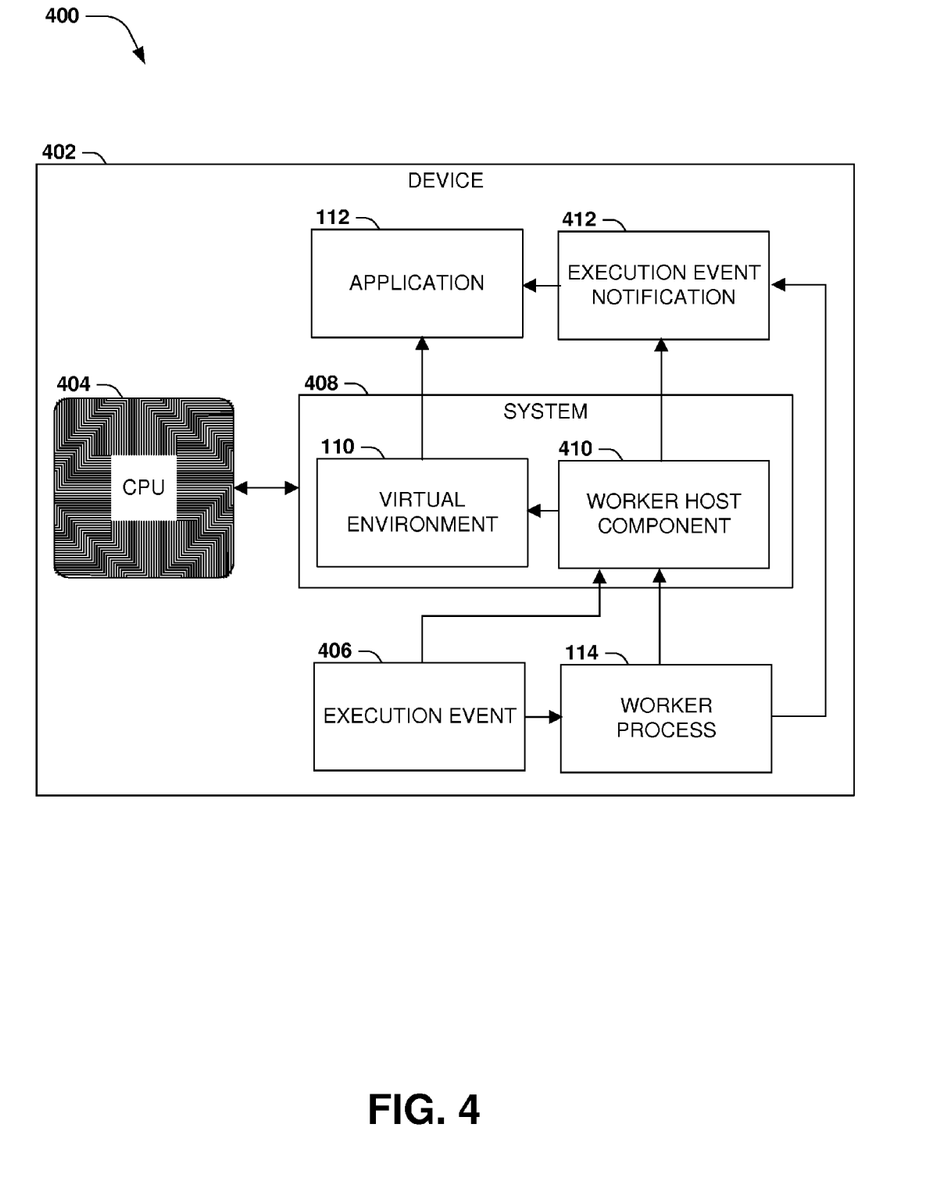
FIG. 4 is a component block diagram illustrating an exemplary system for fulfilling requests of client applications related to local events in accordance with the techniques presented herein.

FIG. 4 presents a second exemplary embodiment of the techniques presented herein, illustrated as an exemplary scenario 400 featuring an exemplary system 408 configured to perform processing on behalf of applications executing within a virtual environment 110 of a device 104. The exemplary system 408 may be implemented, e.g., as instructions stored in a memory component of the device 402 and configured to, when executed on a processor 404 of the device 402, cause the device 402 to operate according to the techniques presented herein. The exemplary system 408 comprises a virtual environment 110 within which at least one application 112 is executing on the device 104. The exemplary system 408 also comprises a worker host component 410 executing on the device 104 outside of the virtual environment 110, and configured to, upon receiving a request from an application 112 to execute a worker process 114 involving an execution event 406, initiate execution of the worker process 114 outside of the virtual environment 110. The worker host component 410 is further configured to, upon detecting termination of the application 112, refrain from terminating the worker process 114; and upon the worker process 114 achieving the execution event 406, notify the application 112 of the execution event 406 of the worker process 114. In this manner, the exemplary system 408 achieves the execution of the worker process 114 on behalf of the application 112 executing within the virtual environment 110 of the device 402 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
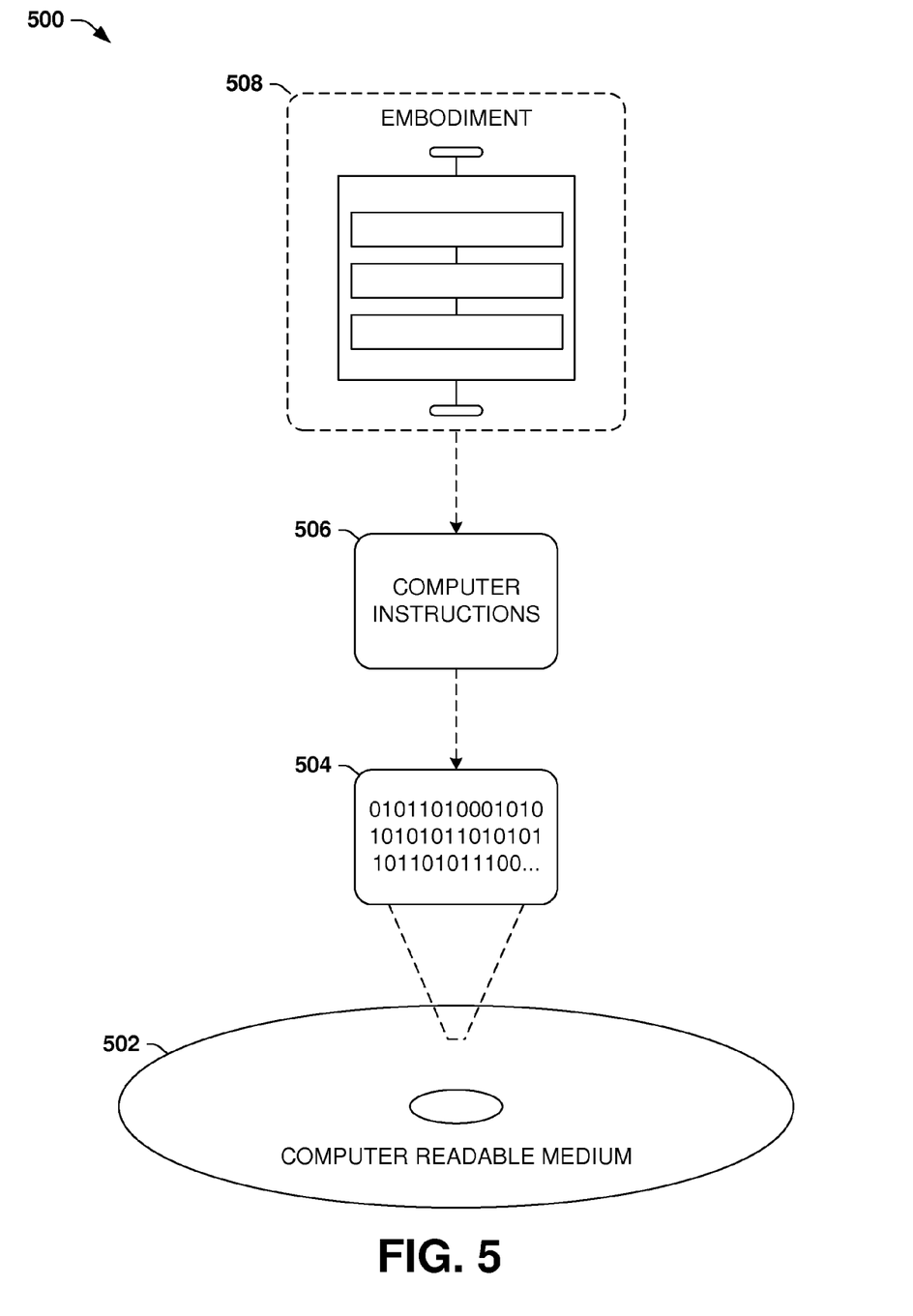
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method 508 of fulfilling requests of client applications 108 related to local events 105, such as the exemplary method 300 of FIG. 3. In another such embodiment, the processor-executable instructions 506 may be configured to implement a system for fulfilling requests of client applications 108 related to local events 206, such as the exemplary system 408 of FIG. 4. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and the exemplary system 408 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 402, such as servers, server farms, workstations, laptops, tablets, mobile phones, game consoles, and network appliances. Such devices 402 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the techniques presented herein may be utilized with various types of servers 102, such as webservers, file servers, application servers, media servers, peer-to-peer sharing coordination servers, database servers, email servers, physical metric monitoring servers, and supervisory control and data acquisition (SCADA) automation servers.

As a third variation of this first aspect, the techniques presented herein may be utilized to service applications 112 executing in many types of virtual environments 110, such as a web browsers, a simulated and/or emulated virtual machine, a middleware platforms, and/or an isolation construct.

As a fourth variation of this first aspect, the techniques presented herein may be utilized to service many types of applications 112, such as web applications written in various interpreted and/or compiled languages, file-sharing applications, media rendering applications, and data-driven client applications.

As a fifth variation of this first aspect, the techniques presented herein may involve executing many types of worker processes 114 within many types of worker process hosts 202. For example, the worker process 114 may comprise a JavaScript script executed according to the HTML 5 "web workers" model, but executed in a separate shell outside of the web browser hosting the application 112. Alternatively, the worker process 114 may comprise a partially or wholly compiled and natively executing application executing in a managed context (wherein the managing runtime comprises the worker process host 202) within the device 104. As another alternative, the worker process host 202 may comprise a local webserver configured to perform persistent background processing on behalf of applications 112 executing within a web browser on the same device. Moreover, the worker process 114 may comprise a JavaScript script utilizing the Node.js server-side JavaScript environment.

As a sixth variation of this first aspect, the worker process 114 may perform many types of background processing on behalf of the application 112, including long-running computational processes (and wherein the execution event comprises a completion of the computational process); a scheduling or timer process (and wherein the execution event comprises a timeout or elapsing of the timer); persistently available functionality, such as a daemon process (and wherein the execution event comprises an invocation of the functionality by another process executing on the device 104); and/or monitoring of various types of device events 116 (and wherein the execution event comprises a detected instance of the device event 116, such as a detection of user input from the user 106 of the device 104, or a hardware or software event arising within the computing environment 108, such as the receipt of an incoming call or message of a mobile phone device). The worker process 114 may apply many types of processing to such device events 116, such as reporting the device event 116 to the application 112, logging the occurrence of the device event 116, or applying additional logic during the handling of the device event 116. These and other scenarios may be compatible with and may advantageously utilize the techniques presented herein.

D2. Worker Process Hosting

A second aspect that may vary among embodiments of the techniques presented herein involves the manner of hosting the execution of the worker process 114 outside of the virtual environment 110. That is, while the worker process 114 is received from the application 112 and executed outside of the virtual environment 110, it may be disadvantageous and/or difficult to allow the worker process 114 to execute outside of the virtual environment 110 without some type of process host, as this may result in the execution of arbitrary and untrusted code as a native process within the computing environment 108 of the device 104. Accordingly, although separated from the virtual environment 110, the execution of the worker process 114 may be attended by a worker host component 410 providing various types of hosting services to the worker process 114.

As a first variation of this second aspect, a worker host component 410 may apply many forms of hosting to the worker process 114. As a first example, the worker host component 410 may also provide a virtual environment 110 for the worker process 114, so long as the virtual environment 110 provided for the worker process 114 is separate from the virtual environment 110 provided for the application 112. Indeed, the virtual environment 110 provided for the worker process 114 may be quite similar to the virtual environment 110 provided for the application 112 (e.g., both processes may execute within the context of a web browser), and the separation of the virtual environments 110 enables the persistence of the worker process 114 independent of the life cycle of the application 112 as provided herein. Additionally, similarities between a first virtual environment 110 provided for the application 112 and a second (separate) virtual environment 110 provided for the worker process 114 may enable some conveniences and efficiencies; e.g., the same security policy applied to the application 112 may be applied to the worker process 114. For example, web applications executing within a web browser are often restricted according to a cross-domain security policy, e.g., enabling the web application only to communicate over the internet with the domain from which the web application was received. The worker host component 410 may restrict the execution of worker processes 114 according to the same cross-domain security policy applied to the web applications executing within the web browser and associated with the worker processes 114, e.g., restricting the worker processes 114 from communicating with any domains, servers, or devices outside of the domain that provided the application 112 to the device 104.

Alternatively, the worker host component 410 may present a different execution model to the worker process 114 with different details. Such differences may be selected and/or designed in view of the different contexts of the application 112 (e.g., an execution environment suitable for ad hoc front-end code presenting a user interface) and the worker process 114 (e.g., an execution environment suitable for computationally complex, long-running processing without a user interface). As a first such example, because worker processes 114 may utilize more computationally complex processes than the application 112, the worker host component 410 may partially and/or wholly compile the worker process 114 before or during execution, thus providing more performant execution through the use of code optimization techniques, while the application 112 may be executed as an interpretable script. As a second such example, the worker host component 410 may schedule the execution of worker processes 114 within the computing environment 108 differently than the scheduling of the application 112 within the virtual environment 110. For example, the worker process 114 may be scheduled as a long-running process particularly suitable for long stretches of comparatively uninterrupted processing during idle periods of the device 104, while the application 112 may be scheduled as a set of highly responsive but short-lived invocations of code, such as responses to user interface events. As a third such example, the worker process 114 may be provided a different set of application programming interfaces (APIs) than the application 112, e.g., lower-level hardware and network communication modules for the worker process 114 and user-interface-type modules for the application 112. As a fourth such example, the worker host component 410 may present a different security model than the virtual environment 110 of the application 112 (e.g., in view of the expanded capabilities of the worker process 114 executing outside of the virtual environment 110, the security processes the worker host component 410 may apply more rigorous code evaluation before and/or during execution to detect and block malicious operations). Conversely, in other respects, the security model of the worker process 114 may be more relaxed than for applications 112 executing within the virtual environment 110; e.g., because communication between the worker process 114 and other devices may be more closely scrutinized with an acceptable increase in communication latency, the worker process 114 may not be restricted according to the cross-domain security policy applied to the application 112. For example, where the device 104 is accessible to a remote process executing on a second device, the worker host component 410 may, upon receiving a request to connect the remote process executing on the second device with the worker process, connect the remote process with the worker process 114. The expansion of functionality may reflect a higher level of trust in the worker process 114 than the application 112, and may be contingent upon user consent; e.g., the worker host component 410 may present to the user 106 an offer to initiate execution of the worker process 114 outside of the virtual environment 110, and may initiate such execution only upon receiving an acceptance of the offer from the user 106. The user 106 may also be permitted to examine the worker processes 114 persisting after the termination of associated applications 112, and to alter the execution thereof (e.g., fulfilling requests by the user 106 to suspend and/or terminate the worker processes 114).

In these and other ways, the execution model provided for the worker process 114 may significantly differ from the execution model provided for the application 112. As a first such example, the worker host component 410 may comprise a managing runtime that enables managed execution of the worker process 114 (e.g., facilitating memory allocation and component access requests according to the architecture of the device 104). As a second such example, the worker host component 410 may comprise a local webserver that is deployed on the device 104 in the service of web applications also executing within a web browser of the device, and configured to executed worker processes 114 as local webserver processes. For example, the worker host components 410 may be designed as JavaScript scripts targeting the Node.js server-side scripting module of a local webserver. As a third such example, the worker hot component 410 may provide a virtual machine, such as a Java virtual machine, that executes separately from the virtual environment 110 in order to separate the life cycle of the worker process 114 from the life cycle of the application 112. Many choices in the execution environment provided by the worker host component 410 to worker processes 114 may be available and compatible with the techniques presented herein.

Figure 6:
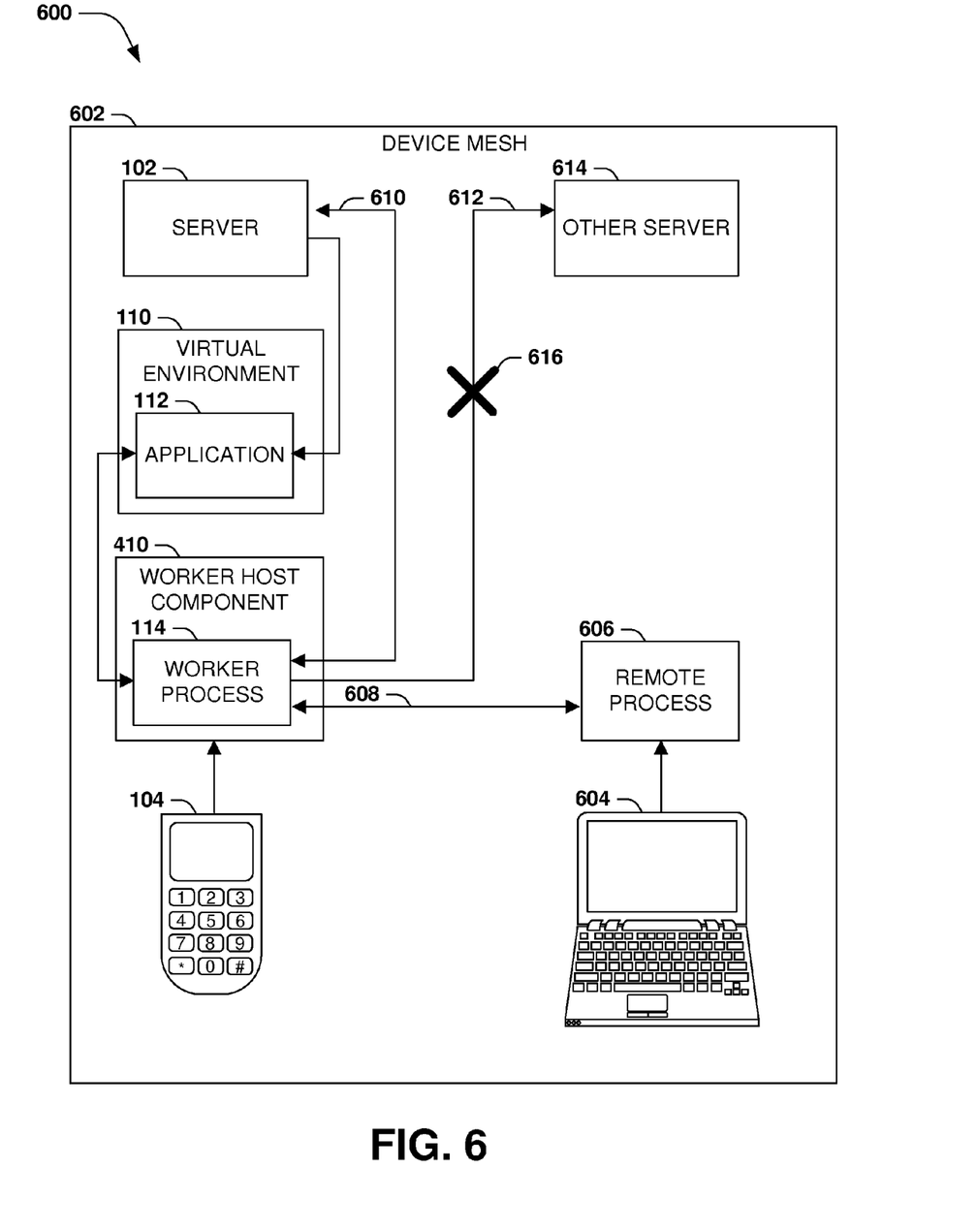
FIG. 6 is an illustration of an exemplary scenario featuring a worker process of an application executing on a device within device mesh, wherein the worker process may attempt to communicate with a server of the application, another server, and a remote process of another device in the device mesh, in accordance with the techniques presented herein.

FIG. 6 presents an illustration of an exemplary scenario 600 featuring several of the variations in the hosting of the worker process 114 by the worker host component 410 provided herein. In this exemplary scenario 600 and in accordance with the techniques presented herein, a device 104 provides a virtual environment 110 executing an application 112, as well as a worker host component 410 executing a worker process 114 on behalf of the application 112 but outside of the virtual environment 110. As a first such example, in some respects, the hosting of the worker process 114 may share similarities with the hosting of the application 112 within the virtual environment 110, such as a similar cross-domain restriction policy. For example, if the application 112 is first received from a server 102 providing a first service (e.g., a web application service) and the worker process 114 later initiates communication 610 with the same server 102, the worker host component 410 may permit the communication 610 with the server 102 providing the first service. However, if the worker process 114 attempts to initiate communication 612 with services provided by other servers 612 than the server 102 providing the first service, the worker host component 410 may block 616 the communication 612. Alternatively or additionally, the security policy applied to the worker process 114 may differ in the same or other respects from that applied to the application 112. For example, in this exemplary scenario 600, the device 104 operates as part of a device mesh 602 comprising a set of devices 104 operated by the same user 106 in an interoperative manner, e.g., with extensive data sharing in order to provide a consistent and seamless user experience to the user 106 across multiple devices 104. Accordingly, the worker process 114 may be permitted to communicate 608 with a remote process 606 executing on a second device 604 within the device mesh 602, even if the application 112 is not permitted to communicate with remote processes 606 outside of the server 102 providing the application 112.

D3. Worker Process Persistence and Resiliency

A third aspect that may vary among embodiments of these techniques involves the persistence of the worker process 114. In addition to refraining from terminating the execution of the worker process 114 upon detecting the termination of the application 112, the techniques presented herein may utilize additional techniques to facilitate the persistence and resiliency of the worker process 114.

As a first variation of this third aspect, the worker host component 410 may also enable the worker process 114 to persist despite termination not just of the application 112, but of the virtual environment 110 (e.g., not just persisting after the user 106 closes the web page hosting the application 112, but persisting after the web browser is entirely terminated and unloaded from memory). Thus, the device 104 may refrain from terminating the worker process 114 even upon terminating the virtual environment 110.

As a second variation of this third aspect, the worker host component 410 may enable the worker process 114 to persist despite faults in the worker host component 410 (e.g., an exception, crash, or termination of the component managing the worker process 114). For example, the worker host component 410 may periodically record the list of executing worker processes 114 and the sources thereof. If a fault arises within the worker host component 410, the device 104 may terminate the worker host component 410, reinitiate execution of the worker host component within the computing environment of the device, and reinitiate execution of the worker processes 114 that were executing within the worker host component 410 at the time of the fault.

As a third variation of this third aspect, the worker host component 410 may even enable the worker process 114 to persist despite significant changes in the computing environment 108 of the device 104. For example, the termination of the application 112 and/or virtual environment 110 may arise during the process of restarting the computing environment 108 of the device 104, such as a reboot. Accordingly, after restarting the computing environment 108, the device may reinitiate execution of the worker processes 114 outside of the virtual environment 110. As a first such example, the device 104 may store the worker process 114 and may periodically record its state, such that, after restarting the computing environment 108, the device 104 may reinitate execution of the worker process 114 with a comparatively recent state. As a second such example, if the worker process 114 is received from and/or remains in communication with a service, the device 104 may, after restarting the computing environment 108, request a second worker process 114 from the service (e.g., a worker process 114 configured to resume execution based on a recent observation or reporting of the state of the first worker process 114), and may, upon receiving the second worker process 114 from the service, execute the second worker process 114 outside of the virtual environment 110 of the device 104. Such persistence may even enable the worker process 114 to persist upon restarting or transitioning the computing environment 108 on a different device 104, e.g., upon transitioning the worker process 114 to a second device 104 within the device mesh 602 of the user 106.

As a fourth variation of this third aspect, the resilience of the worker process 114 may be shared with the application 112. For example, in addition to refraining from terminating the worker process 114 upon terminating the application 112, the worker host component 410 may, upon detecting a reinitiation of the execution of the application 112 within the virtual environment 110, identify any currently executing worker processes 114 that were initiated by the application 112 before termination, and may reconnect the application 112 with the identified worker processes 114. The worker processes 114 may, for example, notify the application 112 of any relevant device events 116 arising on the device 104 during the period of termination of the application 112. These and other techniques for expanding the persistence and resiliency of the worker processes 114 may be devised during and compatible with the implementation of the techniques presented herein.

D4. Application Notification

A fourth aspect that may vary among embodiments of these techniques involves the manner of notifying an application 112 upon an associated worker process 114 achieving an execution event 406.

As a first variation of this fourth aspect, the notification of the application 112 may be achieved through many types of notification mechanisms. As a first such example, the worker host component 410 may simply log the execution event 406, and the application 112 may periodically examine the log of execution events 406 achieved by the worker process 114. As a second such example, the notification may be achieved through message-passing; e.g., the worker process 114 may generate an execution event notification 412 identifying and describing the execution event 406, and the virtual environment 110 may present the execution event notification 412 to the application 112. As a third such example, the notification may be achieved through a callback mechanism, wherein the application 112 indicates a memory location of code to be invoked upon the worker process 114 achieving the execution event 406. This code may comprise, e.g., a portion of the application 112 to be executed within the virtual environment 110; a portion of the worker process 114 to be executed by the worker host component 410; a function of the computing environment 108, such as an API call; or a separate code portion, such as a mobile agent, an abstract syntax tree, or a script.

As a second variation of this fourth aspect, the resiliency of the worker process 114 may extend to the application 112 during the notification. As a first such example, if the worker process 114 achieved the execution event 406 after the application 112 has been terminated, the device 104 may reinitiate the application 112 in the virtual environment 110 as part of the notification process, e.g., by reloading a web page of a web application that created the web worker. As a second such example, the application 112 may be automatically presented to the user 106 as part of the notification process. For example, upon achieving the execution event 406, the device 104 may raise the virtual environment 110 and/or the application 112 to a foreground presentation within the computing environment 108 (e.g., bringing the web browser to the foreground and switching to a tab containing the application 112).

Figure 7:
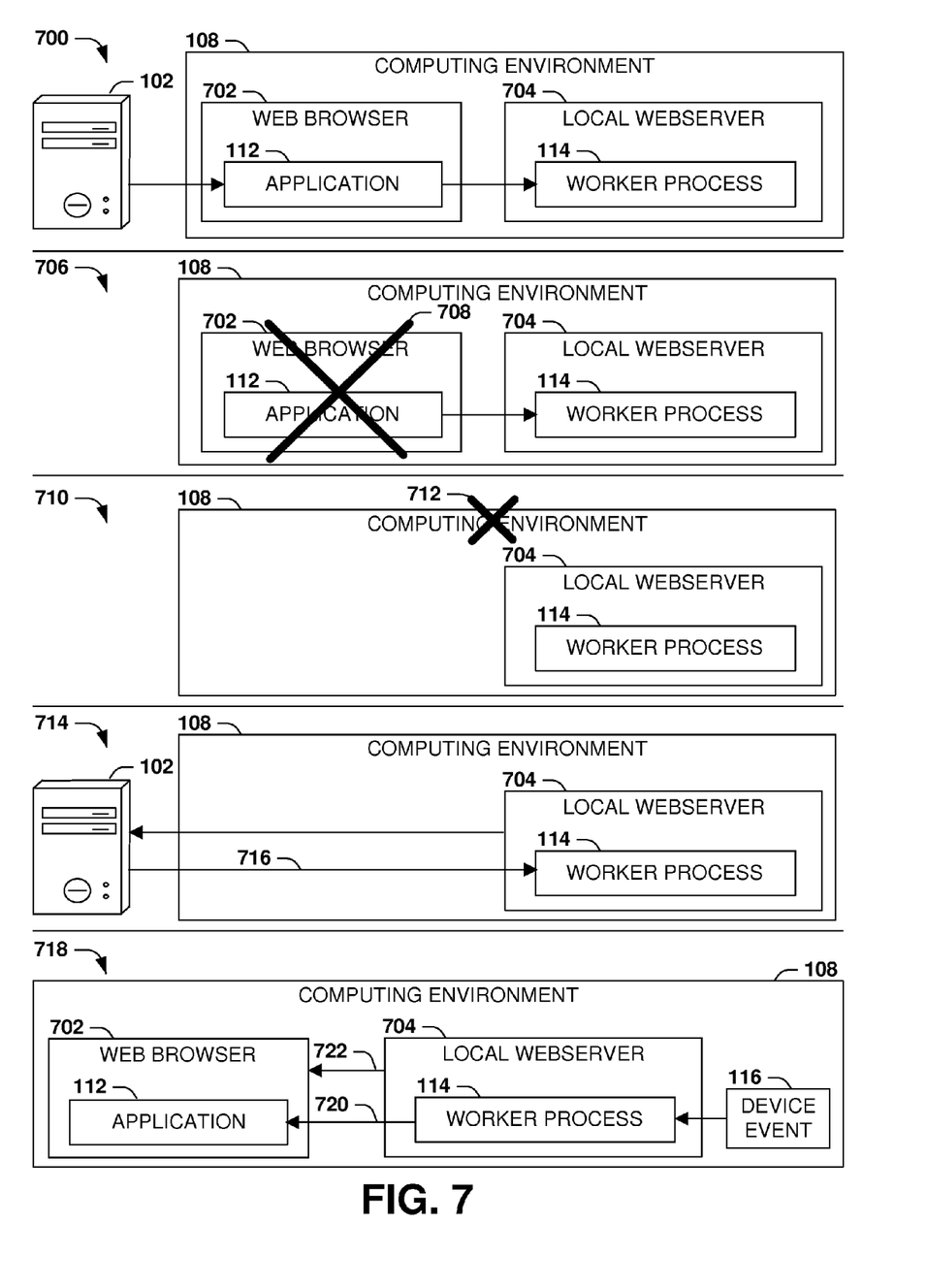
FIG. 7 is an illustration of an exemplary scenario demonstrating an execution of a persistent worker process on behalf of an application executing within a virtual environment in accordance with the techniques presented herein.

FIG. 7 presents an illustration of an exemplary scenario featuring a persistent and resilient worker process executing within a computing environment 108 of a device 104. In this exemplary scenario, at a first time point 700, a web browser 702 (comprising the virtual environment 110 within the computing environment 108) may receive an application 112 from a server 102, and may initiate execution of the application 112 within the web browser 702. This execution may involve a worker process 114 to provide some background processing, which the computing environment 108 may execute as a server process of a local webserver 704. Additionally, the local webserver 704 may record the worker process 114, the server 102 comprising the source of the worker process 114 and application 112, and, periodically, the state of the worker process 114.

At a second time point 706, a termination 708 of the web browser 702 may be initiated by the user 106 and/or the device 104, and such termination 708 may include terminating the application 112 executing within the web browser 702. However, in accordance with the techniques presented herein, the execution of the worker process 114 outside of the web browser 702 enables the worker process 114 to persist despite the termination 708 of the application 112 and the virtual environment 110.

At a third time point 710, the computing environment 108 may also experience a termination 712 (e.g., during a reboot of the device 104). At a fourth time point 714 following the termination 712, the computing environment 108 may be restarted. The restart may involve an automatic reinitiation of the local webserver 704, which may examine the recording of the worker processes 114 hosted by the local webserver 704 at the time of termination 712 of the computing environment 108. The local webserver 704 may then contact the server 102, and may receive 716 from the server 102 a second worker process 114 (e.g., an identical instance to the worker process 114 initiated at the first time point 700, or an altered worker process reflecting the state of the worker process 114 at the time of termination 712). The computing environment 108 may thus automatically reinitiate execution of the worker process 114 following a restart of the computing environment 108.

At a fourth time point 718, a device event 116 may arise within the computing environment 108 (e.g., an incoming call for the user 106). If the worker process 114 is associated with the device event 116 (e.g., as an execution event 406 of the worker process 114), the local webserver 704 may notify the worker process 114 of the device event 116. Additionally, the worker process 114 may notify 720 the application 112 of the device event 116. Moreover, if the application 112 and/or web browser 702 are not currently executing, the device 104 may reinitiate the web browser 702 and/or the application 112 (e.g., by reloading the page within the web browser 702), and, additionally, may bring the web browser 702 to a foreground presentation within the computing environment 108. In this manner, the device 104 may achieve resilient execution the worker process 114 that persists despite the termination of the application 112, the termination of the virtual environment 110, and even the restarting of the computing environment 108, through the application of the techniques presented herein.

E. Computing Environment

Figure 8:
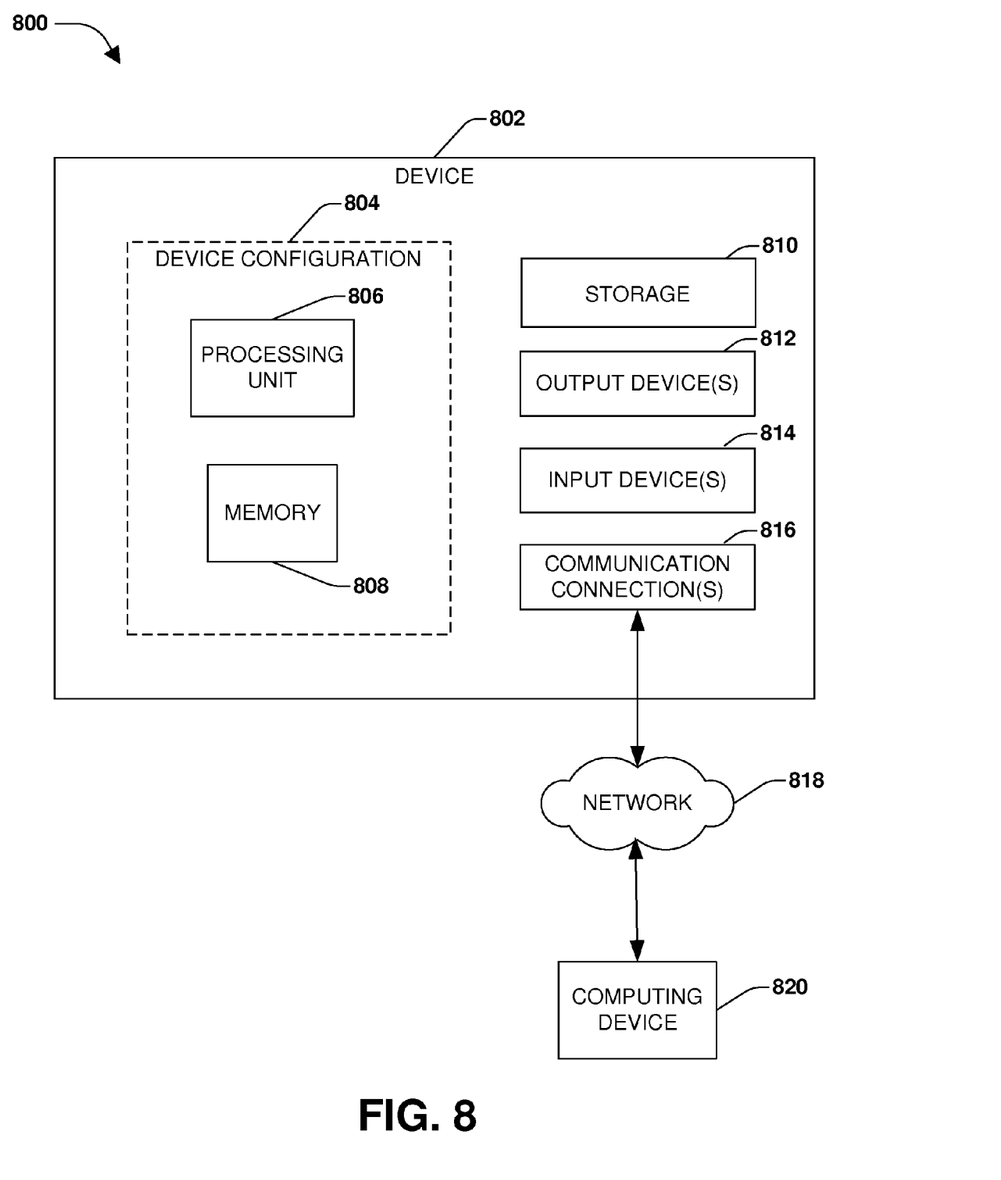
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of performing persistent processing on behalf of applications within a virtual environment of a device having a processor, the method comprising:
executing, on the processor, instructions that cause the device to:
responsive to a request from an application hosted in a web page to execute a worker process involving an execution event, initiate execution of the worker process outside of the virtual environment;
responsive to termination of the web page, refrain from terminating the worker process; and
responsive to an instance of the execution event, transmit a message from the worker process to the application to notify the application of the instance of the execution event handled by the worker process.

2. The method of claim 1, wherein the execution event is selected from an execution event set comprising:
a completion of a computational process;
a timeout;
a detection of user input from a user of the device; and
a detection of a device event of the device.

3. The method of claim 1, wherein executing the instructions further causes the device to, responsive to terminating the virtual environment, refrain from terminating the worker process.

4. The method of claim 1, wherein executing the instructions further causes the device to, responsive to a reinitiation of the application after detecting the termination of the application:
identify at least one identified worker process initiated by the application before termination; and
reconnect the application with the at least one identified worker process.

5. The method of claim 1, wherein notifying the application further comprises:
determining whether the application has been terminated; and
responsive to determining that the application has been terminated, reinitiating the application in the virtual environment.

6. The method of claim 1, wherein:
the request from the application specifying a callback; and
transmitting the message to notify the application comprising: upon the worker process achieving the execution event, invoking the callback of the application to notify the application of the instance of the execution event.

7. The method of claim 1, wherein:
the device further comprises a computing environment; and
terminating the application further comprises: terminating the application while restarting the computing environment of the device.

8. The method of claim 7, wherein executing the instructions further causes the device to, after restarting the computing environment of the device, reinitiate execution of the worker process outside of the virtual environment.

9. The method of claim 1, wherein:
the device is accessible to a remote process executing on a second device; and
executing the instructions further causes the device to, responsive to a request to connect the remote process executing on the second device with the worker process, connect the remote process with the worker process.

10. A system for performing persistent processing on behalf of applications of a device, the system comprising:
- a virtual environment within which at least one application is executing on the device; and
- a worker host environment outside of the virtual environment that:
  - receiving a request from an application to execute a worker process to handle, on behalf of the application, a device event arising on the device, initiates execution of the worker process within the worker host environment and outside of the virtual environment;
  - responsive to termination of the application, refrains from terminating the worker process; and
  - responsive to an instance of the device event arising on the device, invoke the worker process to handle the instance of the device event on behalf of the application.

11. The system of claim 10, wherein:
the virtual environment further comprises a web browser; and
the worker process comprising a web worker executing outside of the web browser.

12. The system of claim 11, wherein the worker host environment restricts the execution of the worker process according to a cross-domain restriction policy of the web browser.

13. The system of claim 11, wherein the worker host environment further comprises a local webserver configured to execute the worker process as a local webserver process.

14. The system of claim 10, wherein:
the worker host environment further comprises a background service executing within a computing environment of the device; and
the worker host environment restarts the worker process automatically after the device restarts the computing environment.

15. The system of claim 10, further comprising: a worker host manager that, responsive to a worker host component fault of the worker host environment:
- terminates the worker host environment;
- reinitiates execution of the worker host environment within the computing environment of the device; and
- reinitiates worker processes that were being executed by the worker host environment during the worker host component fault.

16. The system of claim 10, wherein:
the worker process is received from a service; and
reinitiating execution of the worker process further comprises:
- after restarting the computing environment, requesting a second worker process from the service; and
- responsive to receiving the second worker process from the service, initiating execution of the second worker process within the worker host environment and outside of the virtual environment.

17. The system of claim 10, wherein:
the worker process is received from a first service; and
executing the worker process outside of the virtual environment further comprises: restricting communication between the worker process and services other than the first service.

18. Method of causing a device comprising a processor to perform persistent message processing on behalf of applications within a virtual environment of the device, the method comprising:
- executing, on the processor, instructions that cause the device to:
  - responsive to a request from an application to execute a worker process to handle messages on behalf of the application, initiating execution of the worker process outside of the virtual environment;
  - responsive to termination of the application, refraining from terminating the worker process; and
  - responsive to receiving a message to be handled by the worker process invoking the worker process to handle the message.

19. The method of claim 18, wherein initiating execution of the worker process outside of the virtual environment further comprises:
- presenting to the user an offer to initiate execution of the worker process outside of the virtual environment; and
- responsive to an acceptance of the offer from the user, initiating execution of the worker process outside of the virtual environment.

20. The method of claim 18, wherein:
the device further comprises a computing environment; and
the method further comprises notifying the application that the worker process has been initiated and bringing the virtual environment and the application to a foreground presentation within the computing environment of the device.

* * * * *